United States Patent [19]

Tan et al.

[11] 3,978,285
[45] Aug. 31, 1976

[54] FRAME SYNCHRONIZING DEVICE

[75] Inventors: Yoichi Tan; Shinji Ono, both of Tokyo, Japan

[73] Assignee: Nippon Electric Company, Ltd., Tokyo, Japan

[22] Filed: June 12, 1975

[21] Appl. No.: 586,450

[30] Foreign Application Priority Data
June 13, 1974 Japan.................................. 49/67695

[52] U.S. Cl............................................ 178/69.5 R
[51] Int. Cl.².......................................... H04L 7/08
[58] Field of Search..................... 178/53.1, 69.5 R; 179/15 BS; 340/167 R, 168 R, 168 B, 168 S, 168 CC; 328/63, 72, 73

[56] References Cited
UNITED STATES PATENTS
3,766,316  10/1973  Hoffman et al................ 178/69.5 R
3,883,729  5/1975  de Cremiers..................... 179/15 BS Primary Examiner—Benedict V. Safourek
Attorney, Agent, or Firm—Sughrue, Rothwell, Mion, Zinn and Macpeak

[57] ABSTRACT

The frame holding time can be materially extended without increasing the counter size by insertion of a delay circuit and an AND gate between the framing detector and hunting means. Hunting operation is performed under control of the logical AND of the detector output and its retarded counterpart. The frame holding time obtained in the present invention corresponds to the sum of the retardation time of the delay circuit and the frame holding time of the conventional device.

1 Claim, 4 Drawing Figures

FRAME SYNCHRONIZING DEVICE

BACKGROUND OF THE INVENTION

This invention relates generally to framing or frame synchronizing devices for use in digital transmission systems and more particularly to circuit means used in such devices for frame holding (or forward protection of frame synchronization).

Conventionally, frame synchronizing devices include a comparison circuit for comparing input data with local framing signal bit-by-bit, a framing detector (or frame protecting circuit) operable on the output of the comparison circuit to detect the framing status, and hunting (or searching) means operable under the control of the detector output signal to time-shift the local framing signal so that correct framing is achieved. With such devices, a framing error signal pulse is produced when pulses detected in the comparison circuit are not in coincidence, but such error signal pulse may also result from a spurious out-of-frame condition such as caused temporarily by external disturbance possibly added to the input data. Therefore, framing devices are often designed so as not to decide that framing is lost immediately upon detection of any such temporary out-of-frame condition as resulting from external disturbance, but to decide that framing is lost and start reframing only if and when a framing error signal pulse has been repeated for a predetermined length of time. The length of time during which framing error pulses are ignored is referred to as "forward protecting time". Subsequently, when the detector is in the "framing status", one an out-of-frame condition is detected, the detector remains in the framing status for a definite length of time following the start of reframing even when framing error pulses are no longer produced. The purpose of the latter is for safety in operation. This length of time is referred to as "backward protecting time". The circuit arrangement used to determine the magnitude of the forward and backward protecting time typically takes the form of a counter circuit and is comprised in the framing detector circuit. Namely, framing error pulses from the comparison circuit are counted in the framing detector circuit, for example, up to $l$ bits. The full count number of bits, $l$, represents the forward protecting time of the device. The output of the framing detector or counter circuit is fed to the hunting means as a control signal therefor whereby reframing is started. Any desired length of forward protecting or frame holding time can thus be obtained by selecting an appropriate counter size or full number of bits to be counted in the framing detector circuit.

In order to increase the length of forward protecting time, however, it is necessary to widely increase the number of counter stages or to substantially enhance the hysteresis characteristics of the integrator circuit and the circuit arrangement must inevitably be complicated, including an increased number of component parts.

On the other hand, any exceptional increase in size of the counter circuit provided to count framing error pulses makes it difficult to restore the framing status once reframed erroneously in the reframing process and, in the worst case, detection of out-of-frame conditions is made impossible as the coincidence (YES) counter reaches full count before the out-of-coincidence (NO) counter reaches full count. To cope with this situation, resort may be had, for example, to use of a coincidence counter having a sufficient number of stages but this unavoidably results in an extended backward protecting time.

SUMMARY OF THE INVENTION

The present invention is intended to overcome the difficulties previously met in the art as described above by adding simple circuit means to a conventional frame synchronizing device and has for its object the provision of a novel frame synchronizing device of the type which is as a whole simple in construction having a frame holding time of substantially extended length.

According to the present invention, there is provided an improved frame synchronizing device of the type including a comparison circuit for comparing input data with a local framing signal, a framing detector circuit operable upon the output of the comparison circuit to decide the framing status, and hunting means operable upon the output of the framing detector circuit to time-shift the local framing signal for reframing. The device is characterized in that it comprises a delay circuit associated with the framing detector circuit to retard the output signal therefrom and an AND gate circuit arranged to receive the output signals from the framing detector circuit and said delay circuit and to feed the AND output to said hunting means as a control signal therefor.

The above and other objects, features and advantages of the present invention will become apparent from the following description when taken in conjunction with the accompanying drawings.

DETAILED DESCRIPTION OF THE PREFERRED EMBODIMENTS

Figure 1:
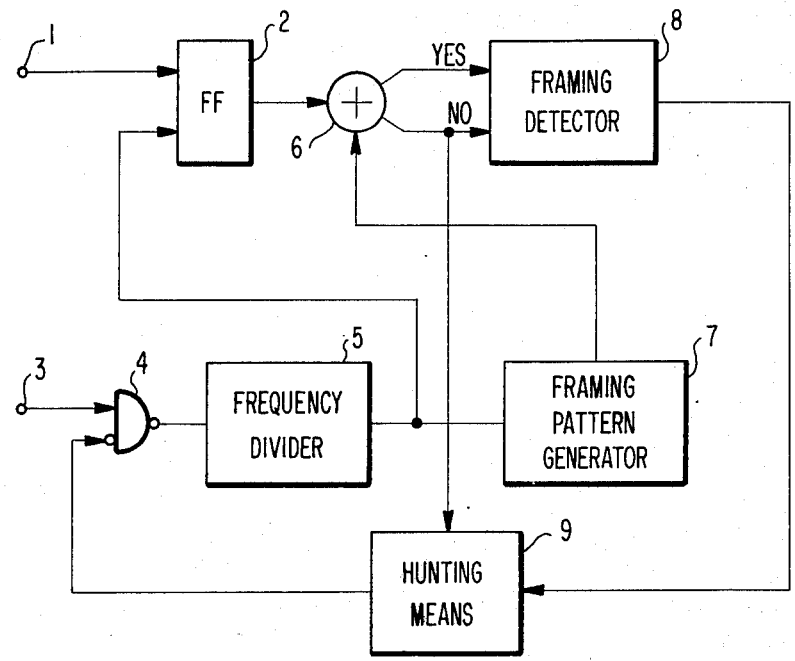
FIG. 1 is a block diagram showing a conventional form of frame synchronizing device.

As is well known, there are two types of frame synchronizing devices, the one-bit-shift device and the reset device. One example of the one-bit-shift device will be described with reference to FIG. 1. Input data at terminal 1 includes one framing signal for every $p$ bits ($p$ being a positive integer) and is directed to a flip-flop 2 provided to read out the framing pulse pattern. Clock pulses appear at terminal 3 and are fed through a gate 4 to a frequency divider 5 where they are reduced in frequency to an integral submultiple, $1/p$, of the clock frequency. The output from the frequency divider 5 is fed to the other input of flip-flop 2. Consequently, framing signals are read out from the input data to be fed to a comparison circuit 6, which is comprised of an exclusive OR circuit. The output from the frequency divider 5 is also fed to a framing pattern generator 7 so that the latter produces a local framing signal which is of the same pattern as the framing signal in the data input and fed to the comparison circuit 6. The comparison circuit 6 produces a YES pulse when the two inputs thereto coincide with each other and a NO pulse when the two inputs are not in coincidence. The YES and NO pulses are fed to a framing detector 8, which detects the framing status, counting or integrating the YES and NO pulses, separately. As a consequence, if it is decided that the system is out-of-frame, a hunting means 9 generates a shift pulse each time a NO pulse from the comparison circuit is detected and such shift pulse is fed to the gate 4 to close it so that the outputs from the frequency divider 5 and the framing pattern generator 7 are both retarded one bit, and in this manner the so-called hunting or searching operation is performed. Subsequently, when it is ascertained that the system is frame synchronized, the hunting means 9 ceases to produce shift pulses.

The forward and backward protecting times can be varied in length by varying the counter capacitances of the framing detector 8 for NO pulses and YES pulses, respectively. Any material extension of the forward protecting time, however, will disadvantageously increase the size and complexity of the counter circuitry, as pointed out previously.

The present invention is designed to overcome this difficulty principally by adding simple circuit means to a conventional form of frame synchronizing device.

According to the present invention, the output of a framing detector is retarded and a logical AND is taken of such output retarded and the original non-retarded detector output and is used to control the hunting means. In other words, the output of the logical AND circuit is dealt with as the output of the framing detector in the conventional framing device, and, in this manner, a framing device is provided which is operable with a limited reframing time and with a frame holding time extended enough to ensure framing protection against any false burst in input data and which is as a whole relatively simple in construction.

Figure 2:
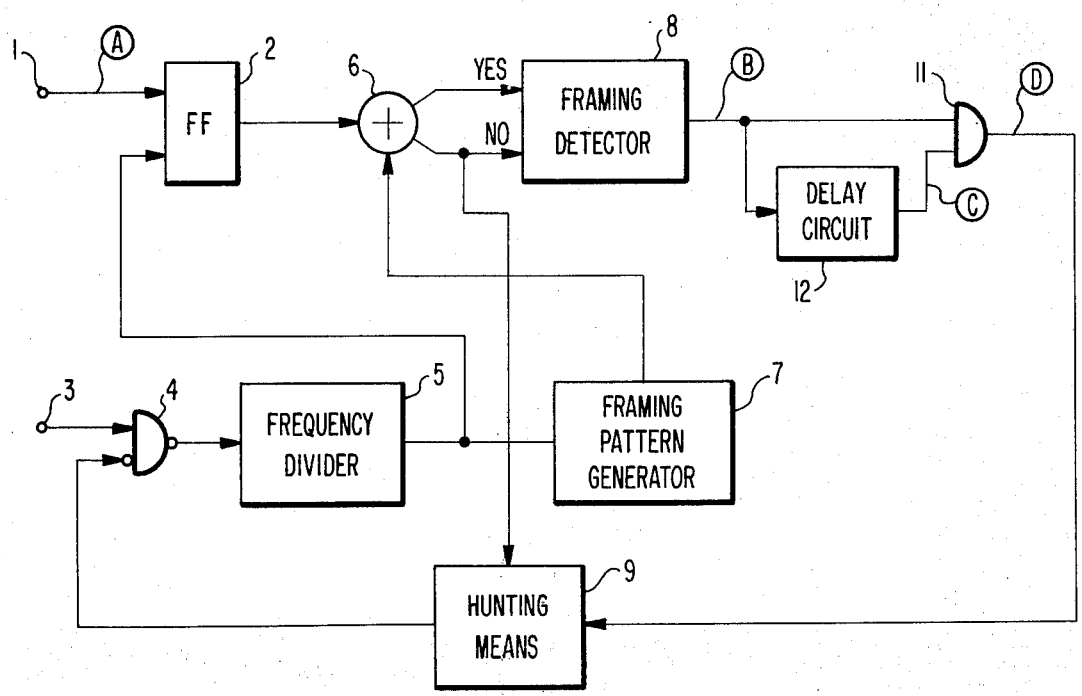
FIG. 2 is a block diagram illustrating a preferred embodiment of the present invention.

Description will now be made of one example of the frame synchronizing device embodying the present invention with reference to FIG. 2, in which those parts corresponding to the components of FIG. 1 are identified by the same reference numerals.

According to the invention, the output of a detector 8 is not only fed directly to a gate circuit 11 but is fed indirectly thereto through a delay circuit 12, which may take the form, for example, of a monostable multivibrator or a delay line. The output of the gate circuit 11, i.e., the logical AND of the two inputs thereto, is directed to a hunting means 9.

Figure 3:
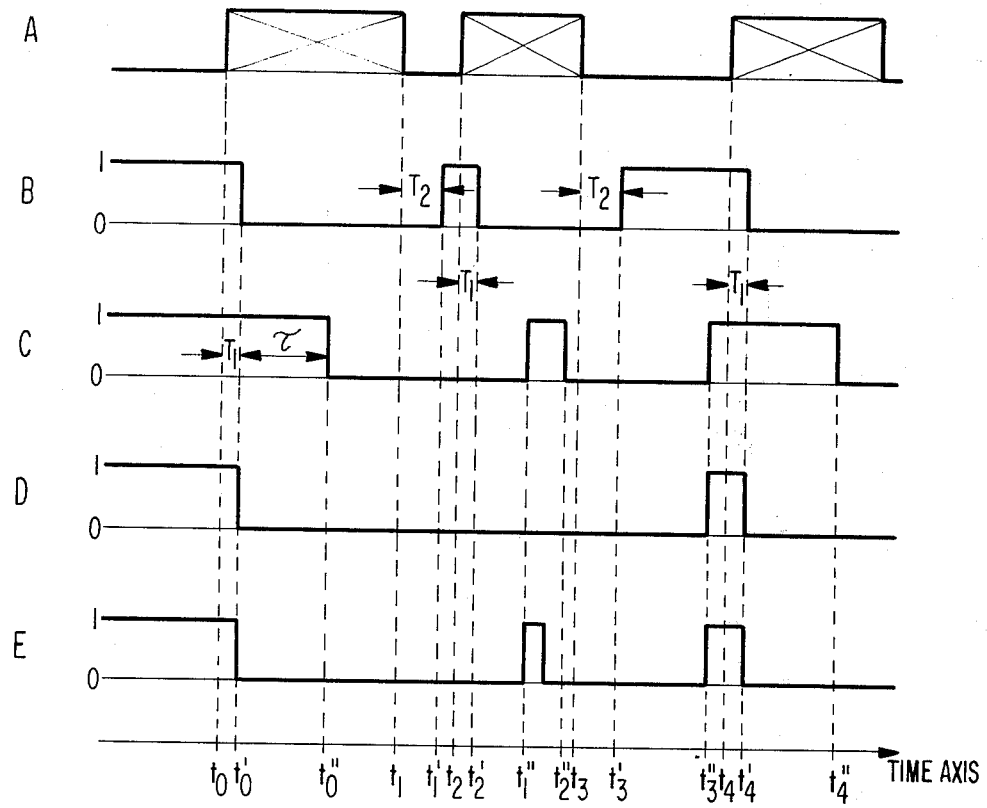
FIG. 3 is a waveform diagram showing waveforms appearing at different points in the device of the present invention.

Referring now to FIG. 3, which illustrates waveforms appearing at different points in the framing device, it is assumed that correct data is fed through the input terminal 1 during time intervals $t_o - t_1$, $t_2 - t_3$ and $t_4 - \infty$ and is interrupted during the remaining periods $t_1 - t_2$ and $t_3 - t_4$, as illustrated at A in FIG. 3. In this case, initially at the point of time $t_o'$, i.e., with a lag of reframe time $T_1$ from time $t_o$, the output of the reframing detector 8 is reduced from its high level "1" to its low level "0", ascertaining the inframe condition, as observed at B in FIG. 3. The output of delay circuit 12 drops to "0" at time $t_o''$ after a further delay, $\tau$, of the circuit 12, as shown at C.

Subsequently, at the time point $t_1$ the input data terminates. After a further period of time, $T_2$, corresponding to the frame holding time of the conventional device, the output level of the detector 8 is restored to its high state, "1". This occurs at time $t_1'$ as shown in FIG. 3B. As shown, the detector output is again reduced to its low "0" at time $t_2'$ with a lag of time $T_1$ from time $t_2$, the second input point of time of data arrival, and restored to the high level at $t_3'$, that is, with a time lag of $T_2$ from the next time of data termination $t_3$ (at B in FIG. 3). The output waveform of the delay circuit is shown as waveform C and corresponds to the waveform B in FIG. 3 as retarded by $\tau$. The output of gate circuit 11 represents the logical AND of two waveforms B and C in FIG. 3, as illustrated at D therein. Namely, the gate output is reduced to its low level "0" at time $t_o'$, i.e., with delay $T_1$ from the first time point of data arrival $t_o$, and restored to its high level at time $t_3''$, i.e., $(T_2 + \tau)$ time after the second time of data termination $t_3$.

It is to be noted that, with the device of the present invention, though the reframe time $T_1$ is the same as that with the case of conventional devices, the frame holding time is materially extended, amounting to $(T_2 + \tau)$, which is the sum of previously common frame holding time $T_2$ and retardation time $\tau$ of the delay circuit 12. With conventional devices, hunting operation must be effected with the start of the second data at the point of time $t_2$. In contrast, with the device of the present invention, the frame holding state is maintained despite data interruption of limited time duration. This enables the input data to be effectively utilized to a maximum extent.

Assume next that data input and clock pulses are continuously fed to terminals 1 and 3, respectively, and as they deteriorate the detector 8 detects an out-of-frame condition with a probability of $q$. In this case, the out-of-frame condition is detected with the same probability of $q$ at the output of delay circuit 12, which output corresponds to the output of the detector circuit retarded by the amount of retardation time $\tau$ of the delay circuit. In addition, the processes of detecting such out-of-frame condition in the two regions can in general be considered independent from each other. Under this situation, the probability with which the out-of-frame condition is detected at the AND output can be expressed as:

$$q^2 \; (<< q << 1)$$

It will thus be noted that the device of the present invention also exhibits a markedly improved performance for framing protection against deterioration in channel quality. This means that the detector circuit 8 can be made simpler in structure than required in FIG. 1 for the same desired frame protecting characteristics and hence a relatively short reframe time be obtained. In this connection, it is to be noted that the clock signal is maintained at least for the time of retardation $\tau$ even if the data input is interrupted during the time period of $t_1 - t_2$.

Next, a more specific example of the device of the present invention will be described with reference to FIG. 4. In this figure, framing signal pulses inserted in input data from terminal 1 are read out in the flip-flop circuit 2 to be compared in comparison circuit 6 with the local framing signal pulses from the pattern generator 7. YES or coincidence pulses from the comparison circuit 6 are directed to an upper counter 8a in the detector 8 while NO or out-of-coincidence pulses from circuit 6 are directed to a lower counter 8b in the detector 8. The upper counter 8a, reaching full count with input of $m$ YES pulses, products a "0" pulse, which is fed to the lower or NO pulse counter 8b to reset it. The upper counter is reset upon reception of a NO pulse from the comparison circuit 6. The lower counter 8b reaches full count with input of $l$ NO pulses to produce a "0" pulse. Here, $l$ and $m$ each represents a positive integer.

With this arrangement, it is to be understood that the NO counter 8b does not produce any output as long as the YES counter 8a is consecutively counting more than $m$ YES pulses and that the YES counter is reset upon reception of a NO pulse before it reaches the full count of $m$. The output pulse from YES counter 8a is sent to a set-reset type flip-flop to set it and is also sent through a delay circuit 12a to another set-reset type flip-flop 14 to set the latter. On the other hand, the output pulse from NO pulse counter 8b is directed to the flip-flop 13 and, through a delay circuit 12b, to the flip-flop 14 to reset the respective flip-flops. At the gate circuit 11, a logical AND of the set outputs of the two flip-flops 13 and 14 is obtained. The output of flip-flop 13 corresponds to the signal B in FIG. 3 and that of flip-flop 14 to the signal C therein. Other components shown in FIG. 4 correspond to those shown in FIGS. 1 and 2, bearing the same reference numerals.

Figure 4:
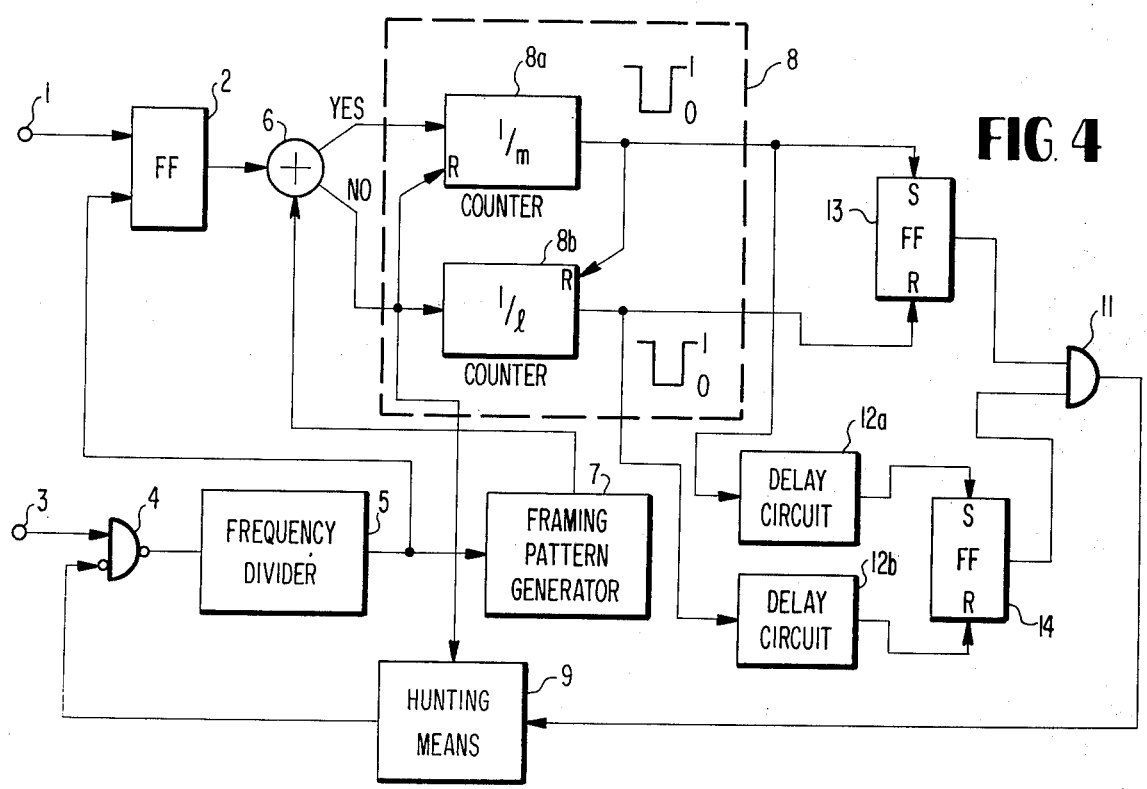
FIG. 4 is a block diagram showing the embodiment of FIG. 2 in further detail.

In the arrangement of FIG. 4, one of the delay circuits, 12a, may be omitted so that the output of the YES pulse counter 8a is also transferred directly to the flip-flop 14 to set it. In this case, after the point of time $t_2'$ in FIG. 3, the flip-flop 14 is set each time the YES counter 8a reaches the full count of $m$ but the output state of flip-flop 14 remains unchanged as it is already in a set state. On the other hand, NO pulse counter 8b reaches the full count of $l$ at time $t_1'$ to produce a "0" pulse, which is fed to the flip-flop 14 only with a time lay of $\tau$ to reset it at time $t_1''$. However, as the YES counter 8a at this time is already in the state of full count, the flip-flop 14 reset is immediately set under the output from the YES counter 8a, as observed at E in FIG. 3. It will thus be appreciated that the objectives of the invention can also be attained satisfactorily with this modification.

Though in the foregoing the invention has been described as applied to the so-called one-bit-shift type of device, it will be readily understood that the invention can also be applied to the reset type of device, in which the framing pattern generator 7 is reset upon decision that framing is lost to start hunting operation.

Incidentally, it will readily be noted that conventional framing devices correspond to those in which the outputs of YES and NO pulse counters, such as 8a and 8b in FIG. 4, are employed directly to serve the purpose of controlling hunting operation. With such devices, the reframe time can be reduced by reducing the size $m$ of the YES counter and the frame holding time be extended by increasing the size $l$ of the NO counter. Assuming a framing pattern of bits inserted one for each microsecond, NO pulses are produced at a cycle of one microsecond (1 $\mu$s) with a probability of ½. Thus, it takes a time of 2 $l$ $\mu$s for the NO counter 8b to produce an output and, in order to obtain a frame holding time, for example, of 10 milliseconds (10 ms) the size $l$ of the NO counter must be increased to as high as 5,000. In contrast, according to the present invention, a retardation time of the order of 10 ms can easily be obtained by the use of a single delay circuit and this makes it possible to obtain a frame holding time extended practically to any desired extent with a simple overall structure including a NO counter of limited size. The difference between the one-bit-shift and reset types of device lies essentially in difference between the techniques of performing hunting operation in accordance with the decision made by the framing detector and the present invention can be regarded in function to form part of the framing detector. It is to be noted, therefore, that the advantageous characteristics of the present invention remain unaffected irrespective of whether the decision output of the detector is employed for one-bit shifting or resetting.

What is claimed is:

1. A frame synchronizing device for a digital transmission system comprising:
   a comparison circuit for comparing input data with a local framing signal and for providing comparison outputs therefrom,
   a framing detector operable in response to said comparison outputs to generate a framing status output,
   delay circuit means connected to said framing detector output for retarding said framing status output,
   an AND gate circuit arranged to receive the output signals from said framing detector and said delay circuit and providing a control output signal therefrom, and
   hunting means operable in response to said control output to time-shift said local framing signal for establishing reframing.

* * * * *